US009176892B2

(12) United States Patent
Benhase et al.

(10) Patent No.: US 9,176,892 B2
(45) Date of Patent: *Nov. 3, 2015

(54) PERFORMING STAGING OR DESTAGING BASED ON THE NUMBER OF WAITING DISCARD SCANS

(71) Applicant: International Business Machines Corporation, Armonk, NY (US)

(72) Inventors: Michael T. Benhase, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/747,351

(22) Filed: Jan. 22, 2013

(65) Prior Publication Data

US 2014/0207999 A1 Jul. 24, 2014

(51) Int. Cl.
*G06F 12/12* (2006.01)
*G06F 12/08* (2006.01)

(52) U.S. Cl.
CPC .......... *G06F 12/121* (2013.01); *G06F 12/0804* (2013.01); *G06F 12/0868* (2013.01); *G06F 2212/604* (2013.01)

(58) Field of Classification Search
CPC . G06F 12/0866; G06F 12/0891; G06F 12/08; G06F 12/0802; G06F 3/064; G06F 3/0683; G06F 12/0817; G06F 12/0246; G06F 12/0804; G06F 12/0895; G06F 12/0815; G06F 12/121; G06F 12/122; G06F 2212/604; G06F 12/0868; G06F 2212/2022
See application file for complete search history.

(56) References Cited

U.S. PATENT DOCUMENTS

| 4,875,155 | A | 10/1989 | Iskiyan et al. | |
| 7,191,207 | B2 | 3/2007 | Blount | |
| 7,769,802 | B2 | 8/2010 | Smith et al. | |
| 8,549,222 | B1 * | 10/2013 | Kleiman et al. | 711/114 |
| 8,621,145 | B1 | 12/2013 | Kimmel et al. | |
| 2004/0117441 | A1 | 6/2004 | Liu et al. | |
| 2006/0069888 | A1 * | 3/2006 | Martinez | 711/162 |
| 2006/0294301 | A1 * | 12/2006 | Zohar et al. | 711/113 |
| 2009/0222621 | A1 | 9/2009 | Ash et al. | |

(Continued)

FOREIGN PATENT DOCUMENTS

EP 1030243 10/2002

OTHER PUBLICATIONS

U.S. Appl. No. 13/491,795, filed Jun. 8, 2012, by inventors M. Benhase, and L.Gupta.

(Continued)

*Primary Examiner* — Hashem Farrokh
(74) *Attorney, Agent, or Firm* — Rabindranath Dutta; Konrad Raynes Raynes Davda & Victor LLP.

(57) ABSTRACT

A controller receives a request to perform staging or destaging operations with respect to an area of a cache. A determination is made as to whether more than a threshold number of discard scans are waiting to be performed. The controller avoids satisfying the request to perform the staging or the destaging operations or a read hit with respect to the area of the cache, in response to determining that more than the threshold number of discard scans are waiting to be performed.

12 Claims, 7 Drawing Sheets

(56) References Cited

U.S. PATENT DOCUMENTS

| | | | |
|---|---|---|---|
| 2009/0249015 A1 | 10/2009 | Tzeng | |
| 2010/0037226 A1* | 2/2010 | Benhase et al. | 718/102 |
| 2010/0257321 A1* | 10/2010 | Gupta | 711/138 |
| 2012/0198174 A1 | 8/2012 | Nellans et al. | |
| 2012/0239853 A1* | 9/2012 | Moshayedi | 711/103 |
| 2012/0324173 A1 | 12/2012 | Benhase et al. | |
| 2013/0042156 A1 | 2/2013 | Srinivasan et al. | |
| 2013/0138884 A1 | 5/2013 | Kawamura | |
| 2013/0262746 A1 | 10/2013 | Srinivasan | |
| 2013/0318283 A1 | 11/2013 | Small et al. | |
| 2014/0068163 A1 | 3/2014 | Benhase et al. | |
| 2014/0068189 A1 | 3/2014 | Benhase et al. | |
| 2014/0068191 A1 | 3/2014 | Benhase et al. | |

OTHER PUBLICATIONS

U.S. Appl. No. 13/491,818, filed Jun. 8, 2012, by inventors M. Benhase, L.Gupta and Matthew J. Kalos.
U.S. Appl. No. 13/569,951, filed Aug. 8, 2012 by inventors M. Benhase, and L, Gupta.
Office Action dated May 5, 2014, pp. 31, for for U.S. Appl. No. 13/491,795, filed Jun. 8, 2012.
Office Action dated May 16, 2014, pp. 21, for U.S. Appl. No. 14/073,545, filed Nov. 6, 2013.
Office Action dated May 8, 2014, pp. 28, for U.S. Appl. No. 13/491,818, filed Jun. 8, 2012.
Office Action dated May 8, 2014, pp. 22, for U.S. Appl. No. 14/073,551, filed Nov. 6, 2013.
Response dated Jun. 16, 2014, pp. 19, to Office Action dated Mar. 14, 2014, pp. 17, for U.S. Appl. No. 13/569,951, filed Aug. 8, 2012.
Response dated Jun. 20, 2014, pp. 17, to Office Action dated Mar. 20, 2014, pp. 15, for U.S. Appl. No. 14/073,570, filed Nov. 6, 2006.
Batsakis et al., "AWOL: An Adaptive Write Optimizations Layer", FAST '08: 6th USENIX Conference on File and Storage Technologies, 2008, pp. 14.
G. Smith, "The Linux Page Cache and pdflush: Theory of Operation and Tuning for Write-Heavy Loads", 2007, pp. 2 [online] http://www.westnet.com/gsmith/content/linux-pdflush.htm.
C.K. Shene, "Multithreaded Programming and ThreadMentor: A Tutorial", Department of Computer Science, Michigan Technological Univeristy, Mar. 2011, pp. 2.
U.S. Appl. No. 14/073,612, filed Nov. 6, 2013.
Office Action dated Mar. 14, 2014, pp. 17, for U.S. Appl. No. 13/569,951 filed Aug. 8, 2012.
Preliminary Amendment filed Jun. 11, 2012, pp. 3, for U.S. Appl. No. 13/491,795, filed Jun. 8, 2012.
Preliminary Remarks dated Nov. 6, 2013, pp. 2, for U.S. Appl. No. 14/073,545, filed Nov. 6, 2013.
Preliminary Remarks dated Nov. 11, 2013, pp. 2, for U.S. Appl. No. 14/073,551, filed Nov. 16, 2013.
Preliminary Remarks dated Nov. 6, 2013, pp. 2, for U.S. Appl. No. 14/073,570, filed Nov. 6, 2013.
Preliminary Amendment dated Nov. 6, 2013, pp. 4, for U.S. Appl. No. 14/073,612, filed Nov. 6, 2013.
Office Action dated Mar. 20, 2014, pp. 15, for U.S. Appl. No. 14/073,570, filed Nov. 6, 2013.
Response dated Aug. 5, 2014, pp. 14, to Office Action dated May 5, 2014, pp. 31, for for U.S. Appl. No. 13/491,795, filed Jun. 8, 2012.
Response dated Aug. 8, 2014, pp. 22, to Office Action dated May 8, 2014, pp. 28, for U.S. Appl. No. 13/491,818, filed Jun. 8, 2012.
Response dated Aug. 8, 2014, pp. 18, to Office Action dated May 8, 2014, pp. 22, for U.S. Appl. No. 14/073,551, filed Nov. 6, 2013.
Response dated Aug. 18, 2014, pp. 7, to Office Action dated May 16, 2014, pp. 21, for U.S. Appl. No. 14/073,545, filed Nov. 6, 2013.
Notice of Allowance dated Sep. 9, 2014, pp. 27, for U.S. Appl. No. 13/569,951, filed Aug. 8, 2012.
Notice of Allowance dated Sep. 9, 2014, pp. 24, for U.S. Appl. No. 14/073,570, filed Nov. 6, 2013.
Office Action dated Aug. 29, 2014, pp. 29, for U.S. Appl. No. 14/073,612, filed Nov. 6, 2013.
Response filed Dec. 1, 2014, pp. 6, to Office Action dated Aug. 29, 2014, pp. 29, for U.S. Appl. No. 14/073,612, filed Nov. 6, 2013.
Final Office Action dated Oct. 31, 2014, pp. 19, for U.S. Appl. No. 13/491,795, filed Jun. 8, 2012.
Final Office Action dated Nov. 6, 2014, pp. 21, for U.S. Appl. No. 13/491,818, filed Jun. 8, 2012.
Final Office Action dated Nov. 7, 2014, pp. 16, for U.S. Appl. No. 14/073,551, filed Nov. 6, 2013.
U.S. Appl. No. 14/588,833, filed Jan. 2, 2015.
Final Office Action Nov. 6, 2014, pp. 17, for U.S. Appl. No. 14/073,545, filed Nov. 6, 2013.
Notice of Allowance dated Jan. 20, 2015, pp. 15, for U.S. Appl. No. 14/073,570, filed Nov. 6, 2013.
Notice of Allowance dated Jan. 22, 2015, pp. 14, for U.S. Appl. No. 13/569,951, filed Aug. 8, 2012.
Notice of Allowance dated May 8, 2015, pp. 36, for U.S. Appl. No. 13/491,795, filed Jun. 8, 2012.
Notice of Allowance dated May 20, 2015, pp. 33, for U.S. Appl. No. 14/073,545, filed Nov. 6, 2013.
Office Action dated May 21, 2015, pp. 29, for U.S. Appl. No. 13/491,818, filed Jun. 8, 2012.
Office Action dated May 19, 2015, pp. 22, for U.S. Appl. No. 14/073,551, filed Nov. 6, 2013.
Final Office Action dated Feb. 12, 2015, pp. 24, for U.S. Appl. No. 14/073,612, filed Nov. 6, 2013.
Response filed May 12, 2015, pp. 6, to Final Office Action dated Feb. 12, 2015, pp. 24, for U.S. Appl. No. 14/073,612, filed Nov. 6, 2013.
Notice of Allowance dated May 19, 2015, pp. 18, for U.S. Appl. No. 14/073,612, filed Nov. 6, 2013.
Response dated Feb. 2, 2015, pp. 8, to Final Office Action dated Oct. 31, 2014, pp. 19, for U.S. Appl. No. 13/491,795, filed Jun. 8, 2012.
Response dated Feb. 5, 2015, pp. 6, to Final Office Action Nov. 6, 2014, pp. 17, for U.S. Appl. No. 14/073,545, filed Nov. 6, 2013.
Response dated Feb. 5, 2015, pp. 13, to Final Office Action dated Nov. 6, 2014, pp. 21, for U.S. Appl. No. 13/491,818, filed Jun. 8, 2012.
Response dated Feb. 9, 2015, pp. 9, to Final Office Action dated Nov. 7, 2014, pp. 16, for U.S. Appl. No. 14/073,551, filed Nov. 6, 2013.
Notice of Allowance dated Jun. 18-20, 2015, pp. 11, for U.S. Appl. No. 14/073,545, filed Nov. 6, 2013.
Office Action dated Jun. 19, 2015, pp. 39, for U.S. Appl. No. 14/588,833, filed Jan. 2, 2015.
Notice of Allowance dated Jun. 22, 2015, pp. 13, for U.S. Appl. No. 14/073,612, filed Nov. 6, 2013.
Notice of Allowance dated Jul. 30, 2015, pp. 15, for U.S. Appl. No. 13/569,951, filed Aug. 8, 2012.
Response dated Aug. 21, 2015, pp. 14, to Office Action dated May 21, 2015, pp. 29, for U.S. Appl. No. 13/491,818, filed Jun. 8, 2012.
Response dated Aug. 19, 2015, pp. 10, to Office Action dated May 19, 2015, pp. 22, for U.S. Appl. No. 14/073,551 filed Nov. 6, 2013.
Notice of Allowance dated Sep. 1, 2015, pp. 13, for U.S. Appl. No. 14/073,551, filed Nov. 6, 2013.

* cited by examiner ically used in data processing environments in which like reference numbers represent corresponding parts throughout:

PERFORMING STAGING OR DESTAGING BASED ON THE NUMBER OF WAITING DISCARD SCANS

BACKGROUND

1. Field

The disclosure relates to a method, system, and article of manufacture for performing stating or destaging based on the number of waiting discard scans.

2. Background

A storage controller may be coupled to one or more of a plurality of hosts. The storage controller may manage a plurality of storage devices, such as disk drives, tape drives, etc., that are coupled to the storage controller. The plurality of hosts may access data stored in the storage devices via the storage controller.

The storage controller may maintain a cache, where a cache is a type of storage that is capable of providing faster access to data in comparison to storage devices such as disk drives or tape drives. The storage space provided by the cache is smaller in size than the storage space provided by the disk drives or tape drives, where the storage provided by the disk drives or tape drives, and other devices, may be referred to as secondary storage. As a result, tracks may need to be staged (i.e., moved to the cache from secondary storage) or destaged (i.e., moved from the secondary storage to the cache) to prevent the cache from becoming full and to provide faster access to data. In many situations, to release space in the cache, tracks may be discarded from the cache via discard scans.

A "Task Control Block" (TCB) is a data structure in the operating system kernel containing the information needed to manage a particular process. Storage controllers may move information to and from storage devices, and to and from the cache by using TCBs to manage the movement of data.

SUMMARY OF THE PREFERRED EMBODIMENTS

Provided are a method, a system, and a computer program product in which a controller receives a request to perform staging or destaging operations with respect to an area of a cache. A determination is made as to whether more than a threshold number of discard scans are waiting to be performed. The controller avoids satisfying the request to perform the staging or the destaging operations or a read hit with respect to the area of the cache, in response to determining that more than the threshold number of discard scans are waiting to be performed.

In further embodiments, the threshold number of discard scans is five or more.

In additional embodiments, the controller satisfies the request to perform the staging or the staging operations or the read hit with respect to the area of the cache, in response to determining that no more than the threshold number of discard scans are waiting to be performed.

In yet additional embodiments, the cache is a flash cache and discard scans are performed asynchronously to release space in the flash cache.

In further embodiments, the area of the cache corresponds to an extent, a track, a volume, a logical subsystem or any other representation of storage.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Storage space may be released in a storage controller for a plurality of reasons. In certain embodiments, storage space may be released when a volume is deleted. In other embodiments, storage space may be released, in response to receiving a host command to reclaim storage space. In certain embodiments, a flash cache is maintained in the storage controller to provide faster access to data to the host. For space to be released, tracks in flash cache may have to be discarded. A discard scan needs to scan the cache directory and discard tracks corresponding to the space being released. In certain embodiments flash cache discard scans are performed asynchronously with respect to requests for space release received from the host.

In certain embodiments, if stage or destage requests are received when discard scans are being performed from the flash cache, the stage or destage requests are not satisfied if more than a threshold number of discard scans are waiting to be performed. For example, in certain embodiments if five or more discard scan processes are waiting to be performed then the stage or destage requests are not satisfied.

Exemplary Embodiments

Figure 1:
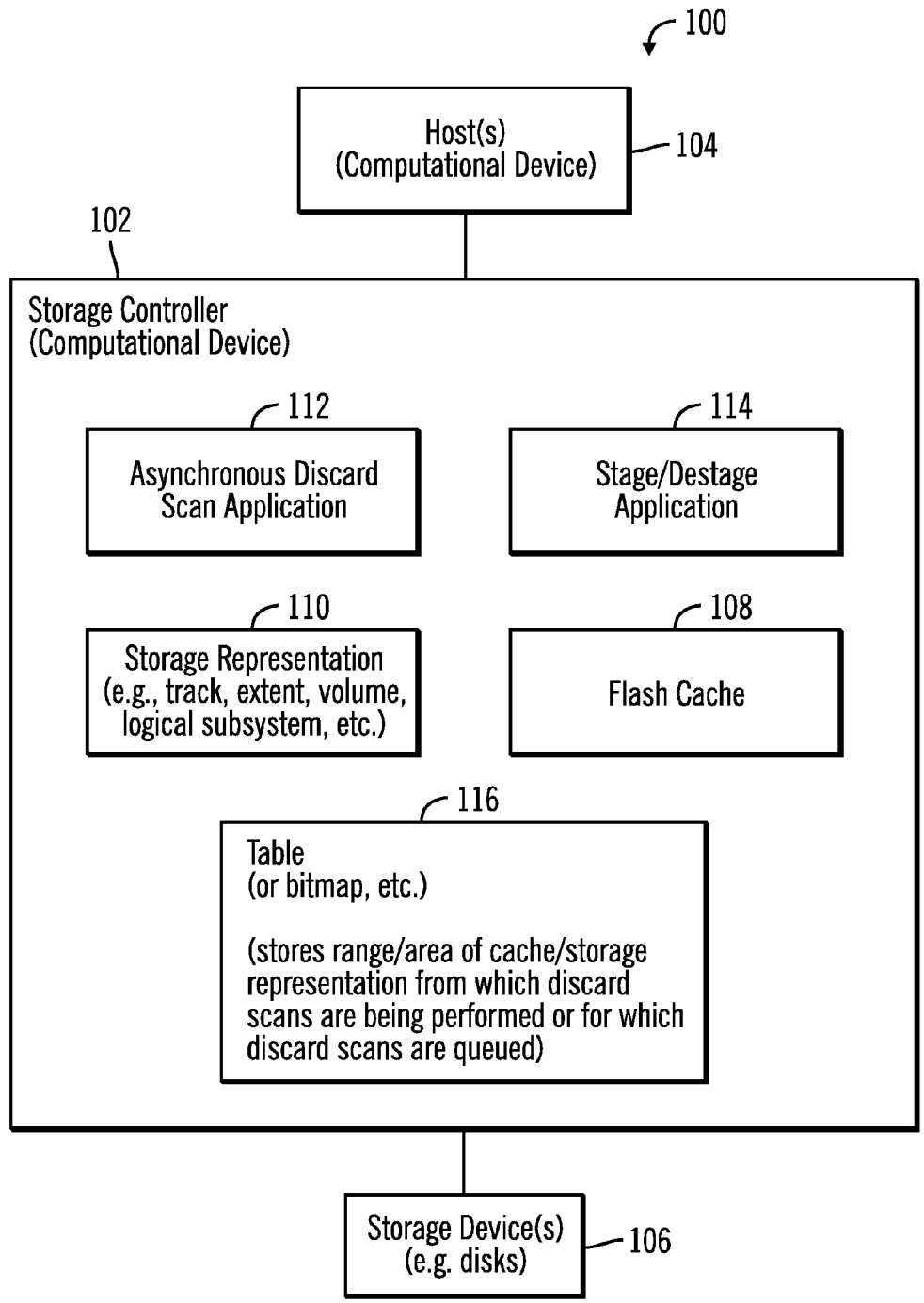
FIG. 1 illustrates a block diagram of a computing environment that includes a storage controller coupled to a host, in accordance with certain embodiments.

FIG. 1 illustrates a block diagram of a computing environment 100 that includes a storage controller 102 coupled to one or more hosts 104, in accordance with certain embodiments. The storage controller manages storage for the host 104, by controlling one or more storage devices 106.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a server, etc. The storage devices 106 may comprise any suitable storage device including those presently known in the art, such as magnetic disks, optical disks, tapes, etc. In certain embodiments, the host 104, the storage controller 102, and the storage devices 106 may be coupled via a network, such as the Internet, an intranet, a storage area network, a local area network, etc.

The storage controller 102 may include a flash cache 108. In certain embodiments, the flash cache 108 may be comprised of a plurality of solid state disks. The flash cache 108 may provide caching services to cache data and provide faster access to data stored in the storage devices 106. The data stored in the flash cache 108 and any other storage media either inside or coupled to the storage controller 102 may be represented via storage representations 110, such as tracks, extents, volumes, subsystems, etc.

The storage controller 102 also includes an asynchronous discard scan application 112 that executes in the storage controller 102. The asynchronous discard scan application 112 may be implemented in software, firmware, hardware, or any combination thereof. The asynchronous discard scan application 112 when executed may perform discard scan processes that are used to determine tracks to be discarded from the flash cache 108 to release space in the flash cache 108.

The storage controller 102 also includes a stage/destage application 114 that executes in the storage controller 102. The stage/destage application 114 may be implemented in software, firmware, hardware, or any combination thereof. The stage/destage application 114 when executed may perform staging of data from the storage devices 106 to the flash cache 108 and/or the destaging of data from the flash cache 108 to the storage devices 106.

The storage controller 102 may also maintain a data structure, such as a table 116 or a bitmap that may store the ranges of tracks or areas of the flash cache 108 from which discard scans are being performed or for which discard scans have been queued. In alternative embodiments, the table 116 may store the identities of extents, volumes, logical subsystems from which discard scans are being performed or for which discard scans have been queued.

Therefore, FIG. 1 illustrates certain embodiments in which a storage controller 102 maintains a flash cache 108 from which space may be released via an asynchronous discard scan application 112. In certain embodiments, if stage or destage requests are received when asynchronous discard scans are being performed from the flash cache, the stage or destage requests axe not satisfied if more than a threshold number of asynchronous discard scans are waiting to be performed.

Figure 2:
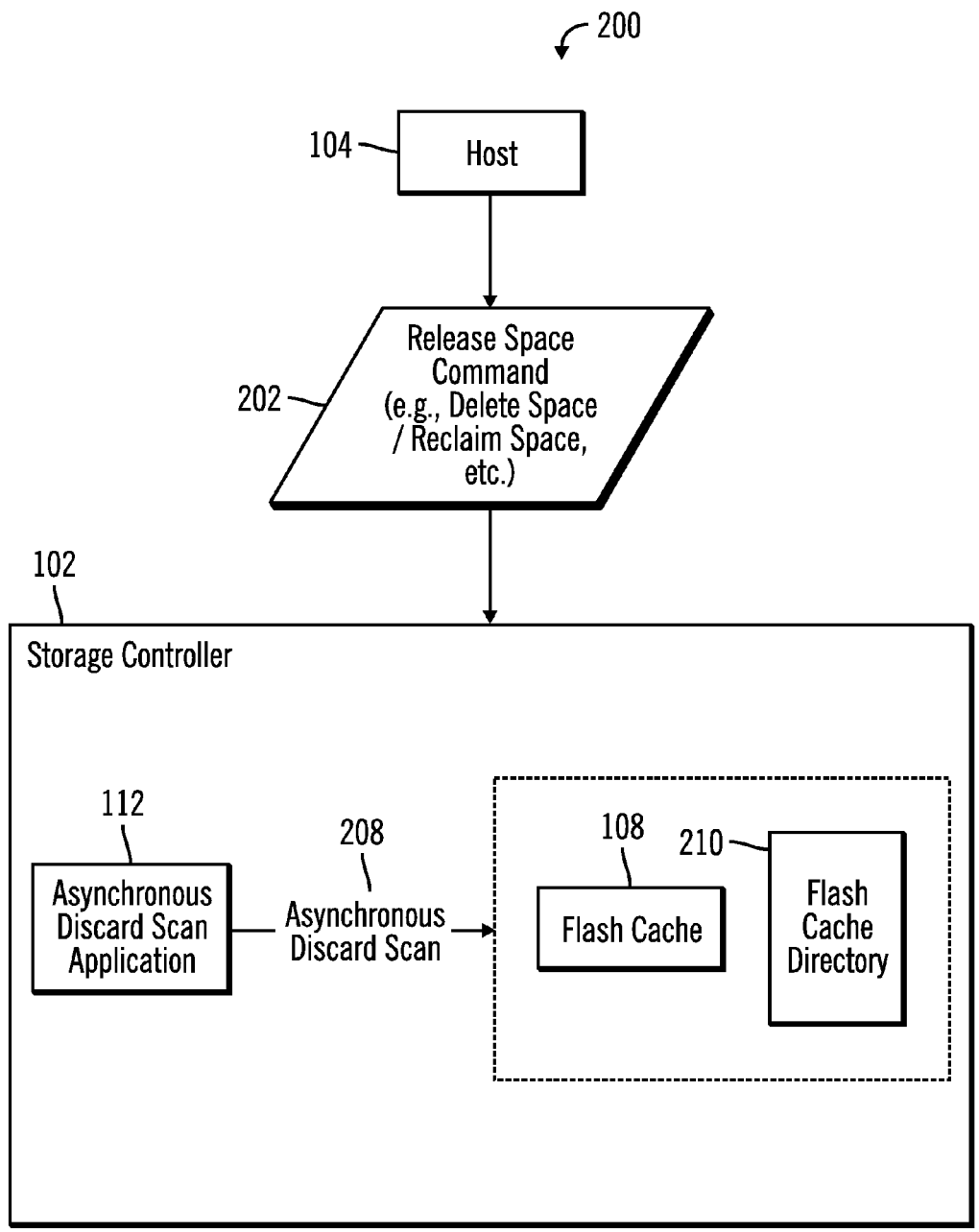
FIG. 2 illustrates a block diagram that shows asynchronous discard scans being performed in a storage controller, in accordance with certain embodiments.

FIG. 2 illustrates a block diagram 200 that shows asynchronous discard scans being performed in the storage controller 102, in accordance with certain embodiments.

In certain embodiments, the host 104 may send the storage controller 102 a release space command 202, where the release space command 202 may request that space is to be released by the storage controller 102. The release of space may occur through various mechanisms, such as deletion of space, reclamation of space, etc.

The storage controller 102 receives the release space command 202, and in response the asynchronous discard scan application 112 may start an asynchronous discard scan process 208 to scan a flash cache directory 210 corresponding to the flash cache 108, to determine tracks that are to be discarded from the flash cache 108. The asynchronicity of the asynchronous discard scan process 208 is with respect to the release space command 202, i.e., the release space command 202 does not wait for completion while the asynchronous discard scan process 208 is being executed.

Tracks are discarded asynchronously from the flash cache 108 because the memory size and the number of tracks in the flash cache 108 are of a sufficiently large magnitude, such that the release space command 202 may fail via timeouts, etc., should the release space command 202 wait while tracks are being discarded from the flash cache 108.

Figure 3:
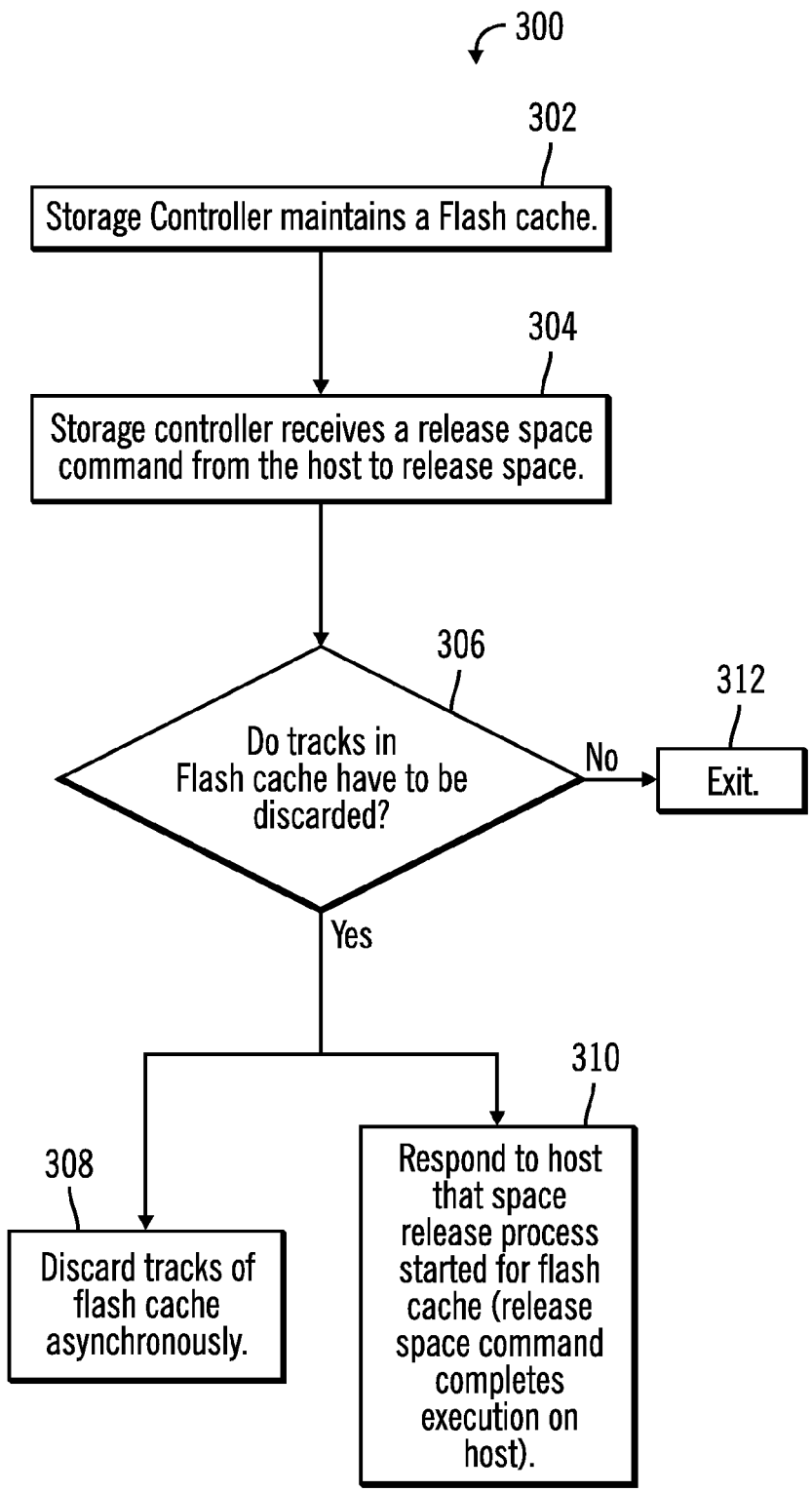
FIG. 3 illustrates flowchart that shows asynchronous discard of tracks in a flash cache, in accordance with certain embodiments.

FIG. 3 illustrates flowchart 300 that shows asynchronous discard of tracks in a flash cache 108, in accordance with certain embodiments. The operations shown in FIG. 3 may be performed by the asynchronous discard scan application 112 that executes in the storage controller 102.

Control starts at block 302, in which the storage controller 102 maintains a flash cache 108. Control proceeds to block 304, in which the storage controller 102 receives a release space command 202 from the host 104 to release space.

From block 304 control proceeds to block 306. At block 306, the asynchronous discard scan application 112 that executes in the storage controller 102 determines whether tracks in the flash cache 108 have to be discarded. If so, control proceeds to blocks 308 and 310 in parallel, and the asynchronous discard scan application 112 discards (at block 308) tracks of the flash cache 108 asynchronously, and in parallel (i.e., prior to completion of the asynchronous discards) responds (at block 310) to the host 104 that the space release process has started for the flash cache 108, and the release space command 202 completes execution. It may be noted that the release space command 202 completes execution while the asynchronous discard scans 208 are still being executed.

From block 306, the process may exit (at block 312) if no tracks have to be discarded from the flash cache 108.

Therefore, FIG. 3 illustrates certain embodiments in which asynchronous discards are performed from the flash cache 108.

Figure 4:
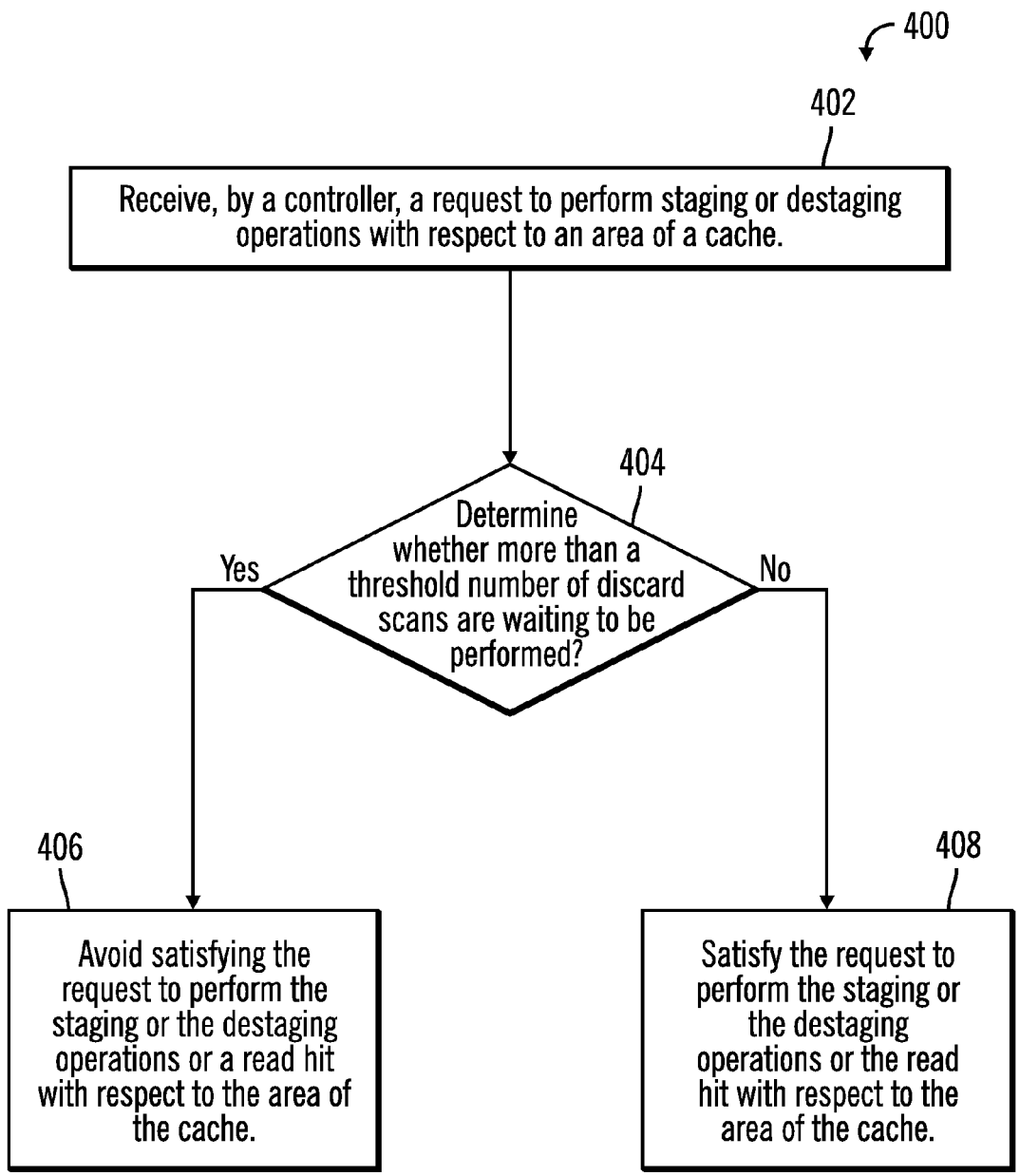
FIG. 4 illustrates a flowchart that shows how requests for staging or destaging operations are satisfied or not satisfied based on how many asynchronous discard scans are waiting to be performed, in accordance with certain embodiments.

FIG. 4 illustrates a flowchart 400 that shows how requests for staging or destaging operations are satisfied or not satisfied when asynchronous discard scans are waiting to be performed, in accordance with certain embodiments. The operations shown in FIG. 4 may be performed by the asynchronous discard scan application 112 and the stage/destage application 114 that execute in the storage controller 102.

Control starts at block 402 in which the storage controller 102 receives a request to perform staging or destaging operations with respect to an area of the flash cache 108, where in certain embodiments the flash cache 108 may be some other type of cache. In certain embodiments, the area of the flash cache 108 corresponds to an extent, a track, a volume, a logical subsystem or any other representation of storage.

A determination is made (at block 404) as to whether more than a threshold number of discard scans are waiting to be performed with respect to the flash cache 108. In certain embodiments threshold number of discard scans is five or more. In certain embodiments, the threshold number of discard scans may be a predetermined number that is stored in the storage controller 102. In alternative embodiments, the threshold number of discard scans may be provided by a user or an administrator during runtime. In yet further embodiments, the threshold number may be determined based on historical performance measures of the storage controller 102, and a threshold number that results in an optimal or improved performance for the storage controller 102 based on the historical performance measures is used.

In response to determining that more than a threshold number of discard scans are waiting to be performed ("Yes" branch from block 404), the storage controller 102 avoids (at block 406) satisfying the request to perform the staging or the destaging operations or a read hit with respect to the area of the flash cache 108. The storage controller 102 may communicate to the requestor of the stage/destage operations that the storage areas (or the corresponding storage representations such as tracks, extents, volumes, logical subsystems, etc.) are unavailable because of waiting discard scans.

In response to determining that not more than a threshold number of discard scans are waiting to be performed for the area of the flash cache ("No" branch from block 404), the storage controller 102 satisfies (at block 408) the request to perform the staging or the destaging operations or a read hit with respect to the area of the flash cache 108.

Therefore, FIG. 4 illustrates certain embodiments, in which while more than threshold number of discard scan are waiting to be performed, areas of the flash cache 108 from which the discards are being performed cannot be used for stage or destage operations. As a result, the asynchronous discard scans can progress much faster and without error in comparison to situations in which asynchronous discard scans are interrupted by stage and destage operations.

Figure 5:
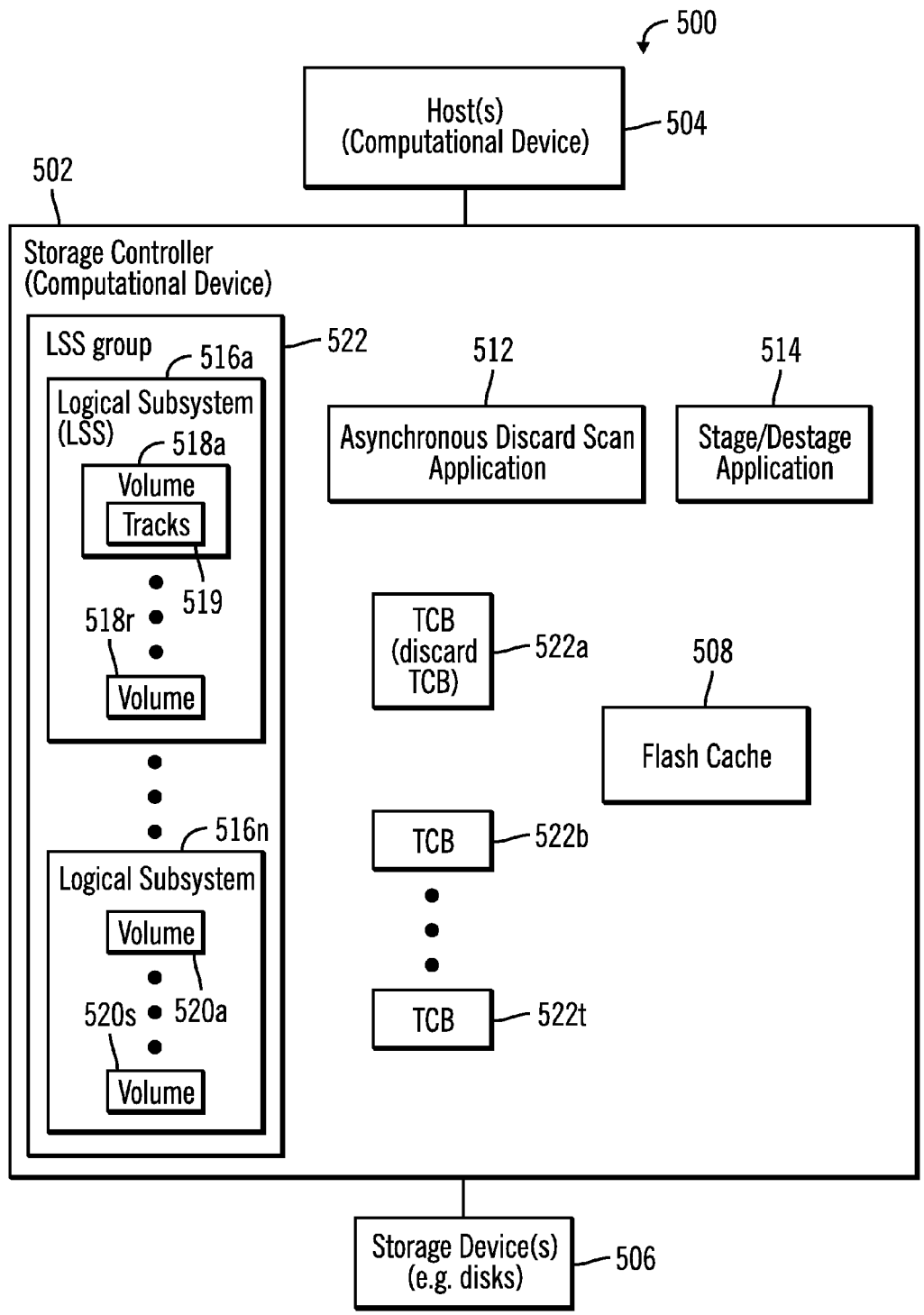
FIG. 5 illustrates a block diagram of another computing environment that includes a storage controller coupled to a host, in accordance with certain embodiments, in accordance with certain embodiments.

FIG. 5 illustrates a block diagram of another computing environment 500 that includes a storage controller 502 coupled to a host 504 and storage devices 506, in accordance with certain embodiments. The storage controller 504 includes an asynchronous discard scan application 512 and a stage/destage application 514. Additionally, a flash cache 508 is maintained within or coupled to the storage controller 502.

The storage controller 502 controls a plurality of logical subsystems (LSS) 516a . . . 516n where a logical subsystem may be comprised of a plurality of volumes, and where a volume may be comprised of a plurality of tracks 519. For example, logical subsystem 516a is comprised of volumes 518a . . . 518r, and logical subsystem 516n is comprised of volumes 520a . . . 520s. A plurality of logical subsystems that is owned for Input/Output (I/O) may be referred to as a logical subsystem group 522.

The storage controller may also maintain a plurality of task control blocks (TCB) 522a . . . 522t, where each task control block is referred to as a discard TCB that is a data structure in the operating system kernel containing the information needed to manage a discard scan process corresponding to a range of tracks, volumes, LSS, or an LSS group.

Therefore, FIG. 5 illustrates certain embodiments in which the storage controller 502 maintains a plurality of logical subsystems 516a . . . 516n, where each logical subsystem stores a plurality of volumes, and where a logical storage group is a plurality of logical subsystems that is owned for input/output (I/O) operations.

Figure 6:
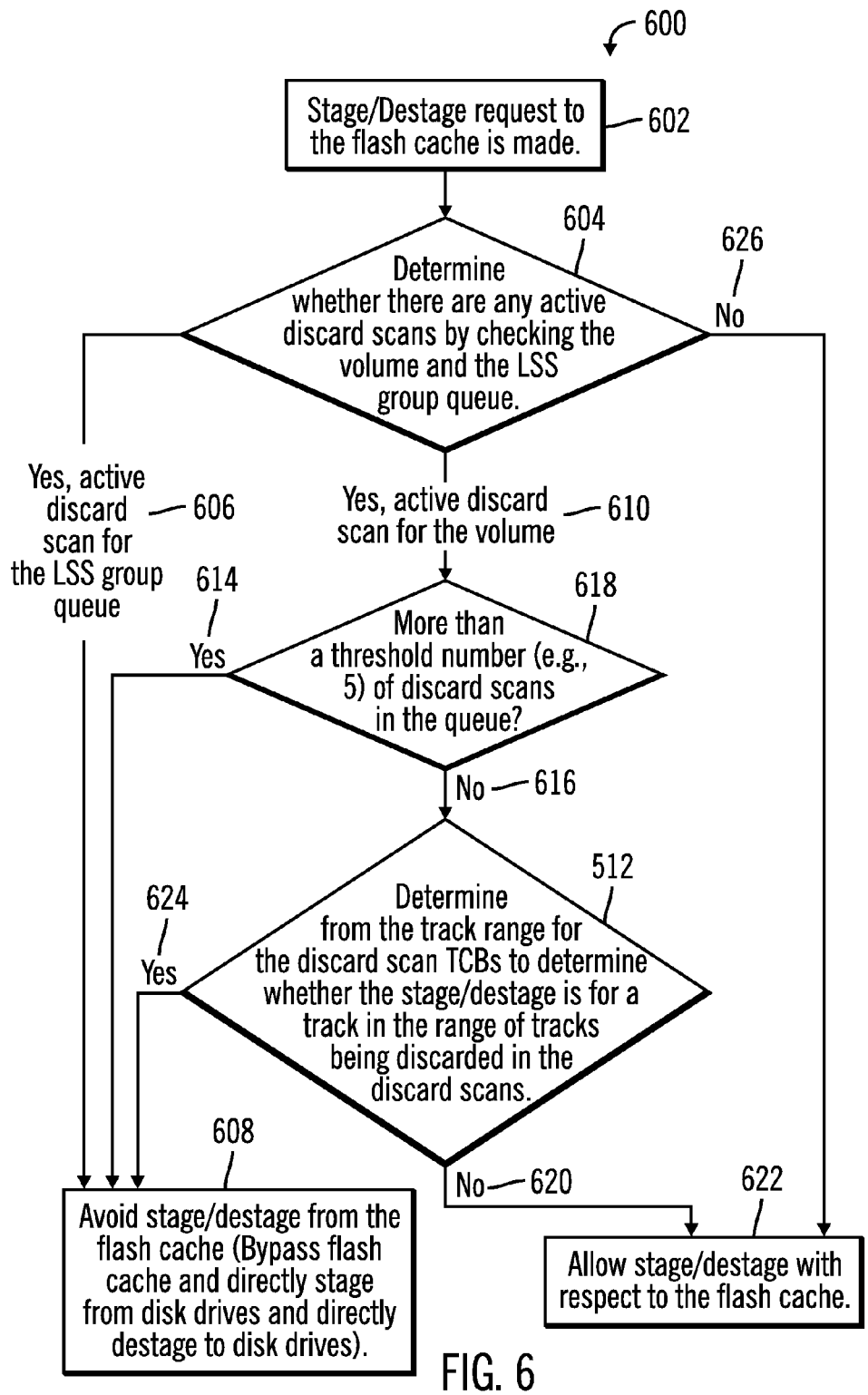
FIG. 6 illustrates a flowchart that shows how requests for staging or destaging operations are satisfied or not satisfied in a system with logical subsystems and volumes based on the number of asynchronous discard scans that are waiting to be performed, in accordance with certain embodiments.

FIG. 6 illustrates a flowchart 600 that shows how requests for staging or destaging operations are satisfied in a storage controller 502 with logical subsystems 516a . . . 516n and volumes 518a . . . 518r, 520a . . . 520s, when asynchronous discard scans are waiting to be performed, in accordance with certain embodiments. The operations shown in flowchart 600 may be performed by the asynchronous discard scan application 512 and the stage/destage application 514 that execute in the storage controller 502.

Control starts at block 602 in which a stage/destage request with respect to the flash cache 508 is received by the storage controller 502. Control proceeds to block 604 in which a determination is made as to whether there are any active discard scans for a logical subsystem group or a volume by checking the volume and the logical subsystem group queue. If there is an active discard scan for a logical subsystem group (branch shown via reference numeral 606) control proceeds to block 608 in which the flash cache 508 is bypassed and data is directly staged from disk drives 506 and directly destaged to disk drives 506. Additionally, the storage controller 508 may send a message to the requestor of the stage/destage request that the logical subsystem group for stage/destage is unavailable as it is being used for discard scans or some other informative message.

If at block 604 a determination is made that there is a active discard scan for a volume (branch shown via reference numeral 610) then control proceeds to block 612 in which a determination is made as to whether there are more than a threshold number (e.g., 5) of discard scans in a discard scan queue. If so, ("Yes" branch 614) then stages or destages with respect to the flash cache 508 are avoided (at block 608).

If at block 612 a determination is made ("No" branch 616) that there are no more than a threshold number of discard scans in the discard scan queue, control proceeds to block 618 where a determination is made from the track range for the discard scan TCBs whether the stage/destage is for a track in the range of tracks being discarded in the discard scans. If not ("No" branch 620) stage/destage with respect to the flash cache 508 are allowed and the stage/destage operations are performed (at block 622). If at block 618 a determination is made ("Yes" branch 624) from the track range for the discard scan TCBs that the stage/destage is for a track is in the range of tracks being discarded in the discard scans then control proceeds to block 608 in which stages or destages from the flash case 508 are avoided.

If at block 604 a determination is made that there are no active discard scans for a logical subsystem group or a volume ("No" branch 626) control proceeds to block 622 where stage/destage with respect to the flash cache 508 are allowed, and the stage/destage operations are performed.

Therefore, FIG. 6 illustrate certain embodiments in which stage or destage operations are avoided when more than a threshold number of discard scans are waiting in a queue.

FIGS. 1-6 illustrate certain embodiments in which stages and destages from areas of the flash cache are avoided when more than a threshold number of discard scans are waiting to be performed. As a result, the asynchronous discard scans can progress much faster and without error in comparison to situations in which asynchronous discard scans are interrupted by stage and destage operations.

In certain embodiments, while discard scans are in progress or queued to areas of the flash cache 108, certain embodiments do not satisfy stage/destage requests with respect to those areas of the flash cache 108. Additionally, not only are stage/destage requests not satisfied but also operations are performed to not satisfy read hits that are run in a "bypass cache" mode until the discard scans have completed: i.e., the following operations are performed: (a) do not promote to the cache (i.e. do not stage); (b) do not demote from the cache (i.e., do not destage); and (c) do not satisfy a read hit from the cache (i.e., bypass cache completely).

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RE, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
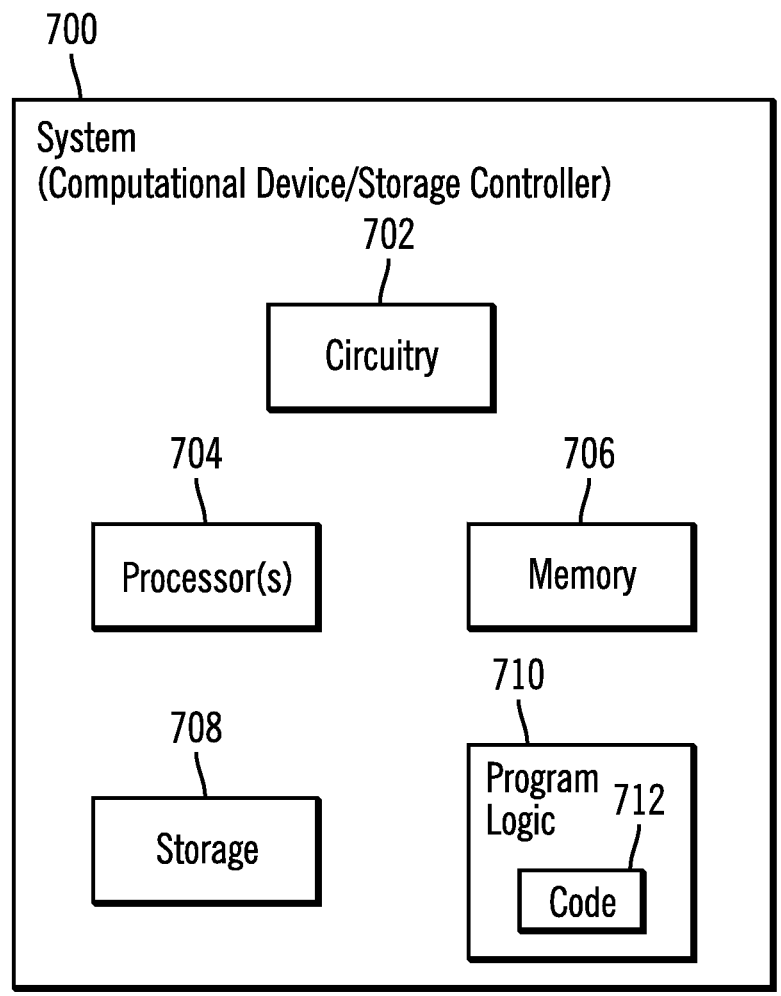
FIG. 7 illustrates a block diagram of a computational system that shows certain elements that may be included in at least the storage controllers of FIG. 1 or 5, in accordance with certain embodiments.

FIG. 7 illustrates a block diagram that shows certain elements that may be included in the storage controllers 102, 502 in accordance with certain embodiments. The system 700 may comprise the storage controllers 102, 502 and may include a circuitry 702 that may in certain embodiments include at least a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system coupled to a flash cache, the system comprising:
   a memory; and
   a processor coupled to the memory, wherein the processor performs operations, the operations comprising:
   receiving a request to perform staging or destaging operations with respect to an area of the flash cache, wherein an asynchronous discard scan scans a flash cache directory corresponding to the flash cache to determine tracks to discard from the flash cache, and wherein the staging or destaging operations with respect to the area of the flash cache occurs between the flash cache and disks;
   determining whether more than a threshold number of asynchronous discard scans are waiting to be performed; and
   in response to determining that more than the threshold number of asynchronous discard scans are waiting to be performed, avoiding satisfying the request to perform the staging or the destaging operations or a read hit with respect to the area of the flash cache.

2. The system of claim 1, wherein the threshold number is five or more.

3. The system of claim 1, the operations further comprising:
   in response to determining that no more than the threshold number of asynchronous discard scans are waiting to be performed, satisfying the request to perform the staging or the destaging operations or the read hit with respect to the area of the flash cache.

4. The system of claim 1, wherein the area of the cache corresponds to an extent, a track, a volume, a logical subsystem or any other representation of storage.

5. A computer program product, the computer program product comprising:
   a non-transitory computer readable storage medium having computer readable program code embodied therewith, the computer readable program code configured to perform operations on a controller coupled to a flash cache, the operations comprising:
   receiving a request to perform staging or destaging operations with respect to an area of the flash cache, wherein an asynchronous discard scan scans a flash cache directory corresponding to the flash cache to determine tracks to discard from the flash cache, and wherein the staging or destaging operations with respect to the area of the flash cache occurs between the flash cache and disks;
   determining whether more than a threshold number of asynchronous discard scans are waiting to be performed; and
   in response to determining that more than the threshold number of asynchronous discard scans are waiting to be performed, avoiding satisfying the request to perform the staging or the destaging operations or a read hit with respect to the area of the flash cache.

6. The computer program product of claim 5, wherein the threshold number is five or more.

7. The computer program product of claim 5, the operations further comprising:
   in response to determining that no more than the threshold number of asynchronous discard scans are waiting to be performed, satisfying the request to perform the staging or the destaging operations or the read hit with respect to the area of the flash cache.

8. The computer program product of claim 5, wherein the area of the cache corresponds to an extent, a track, a volume, a logical subsystem or any other representation of storage.

9. A storage controller coupled to a host, the storage controller comprising:
   a processor; and
   a cache coupled to the processor, wherein the storage controller performs operations, the operations comprising:
   receiving a request from the host to perform staging or destaging operations with respect to an area of a flash cache, wherein an asynchronous discard scan scans a flash cache directory corresponding to the flash cache to determine tracks to discard from the flash cache, and wherein the staging or destaging operations with respect to the area of the flash cache occurs between the flash cache and disks;
   determining whether more than a threshold number of asynchronous discard scans are waiting to be performed; and in response to determining that more than the threshold number of asynchronous discard scans are waiting to be performed, avoiding satisfying the request to perform the staging or the destaging operations or a read hit with respect to the area of the flash cache.

10. The storage controller of claim 9, wherein the threshold number is five or more.

11. The storage controller of claim 9, the operations further comprising:

in response to determining that no more than the threshold number of asynchronous discard scans are waiting to be performed, satisfying the request to perform the staging or the destaging operations or the read hit with respect to the area of the flash cache.

12. The storage controller of claim 9, wherein the area of the cache corresponds to an extent, a track, a volume, a logical subsystem or any other representation of storage.

\* \* \* \* \*